United States Patent [19]

Valet et al.

[11] Patent Number: 5,238,745
[45] Date of Patent: Aug. 24, 1993

[54] PROTECTIVE COATING FOR WOOD

[75] Inventors: Andreas Valet, Eimeldingen, Fed. Rep. of Germany; Daniel Rogez, Mulhouse, France; Rolf Tiefenauer, Basel, Switzerland

[73] Assignee: Ciba-Geigy Corporation, Ardsley, N.Y.

[21] Appl. No.: 883,223

[22] Filed: May 7, 1992

Related U.S. Application Data

[63] Continuation of Ser. No. 647,116, Jan. 24, 1991, abandoned.

[30] Foreign Application Priority Data

Jan. 29, 1990 [CH] Switzerland .............................. 265/90

[51] Int. Cl.⁵ .................... B32B 27/38; B32B 21/04; B05D 3/02
[52] U.S. Cl. ................................. 428/413; 428/423.7; 428/424.4; 428/425.3; 428/481; 428/483; 428/518; 428/520; 428/498; 428/499; 428/537.1; 428/543; 428/70 A

[58] Field of Search ...................... 428/499, 498, 537.1, 428/543, 704, 413, 424.4, 423.7, 425.5, 481, 483, 518, 520

[56] References Cited

U.S. PATENT DOCUMENTS

| | | | |
|---|---|---|---|
| 3,285,855 | 11/1966 | Dexter et al. | 252/57 |
| 4,585,703 | 4/1986 | Taguchi et al. | 428/537.1 |
| 4,847,002 | 7/1989 | Trumble et al. | 428/537.1 |

OTHER PUBLICATIONS

D. N. S. Hon et al., J. Appl. Polymer Sci. 30, 1429 (1985).
Derwent Abst. 84-203744/33.

*Primary Examiner*—P. C. Sluby
*Attorney, Agent, or Firm*—Luther A. R. Hall

[57] ABSTRACT

A protective coating for wood comprising a) an undercoat which penetrates the surface of the wood and contains a phenolic antioxidant, and b) a conventional top coat. The top coat preferably contains a light stabiliser.

19 Claims, No Drawings

PROTECTIVE COATING FOR WOOD

This is a continuation of application Ser. No. 647,116, filed on Jan. 24, 1991, now abandoned.

The present invention relates to a method of protecting wood surfaces against damage by light and to a protective coating for wood.

Wood surfaces which are exposed to sunlight are damaged in particular by the UV light present in the sunlight. The polymeric constituents of the wood are degraded, so that the surface undergoes roughening and discolouration. As a consequence, attack by microorganisms, especially fungi, gives rise to further damage.

The conventional method of protecting wood against light-induced degradation, without having to forgo the attractive appearance of the wood surface, is to coat the wood with a colourless varnish which contains a light stabiliser, especially a UV absorber. Investigations have also been made to determine whether the addition of an antioxidant to the protective coatings reinforces the effect of the light stabiliser in the wood varnish. According to D.N.S. Hon et al., J. Appl. Polymer Sci. 30 (1985), 1439, no, or only an insignificant effect, is obtained.

The addition of phenolic antioxidants to wood varnishes is known. For example, U.S. Pat. No. 3,285,855 discloses the colour stabilisation of furniture varnishes based on acid-curable urea/formaldehyde alkyd resins by adding 0.2% by weight of a phenolic antioxidant. Wood protective coatings which contain a UV absorber, an antioxidant and an insecticide are disclosed in JP-A-59/115 805.

It has now been found that antioxidants of the type of the sterically hindered phenols have a marked stabilising action against light-induced degradation if they are applied, without the addition of a light stabiliser, to an undercoat which penetrates the surface of the wood, and the wood is then provided with a top coat, which top coat may contain a light stabiliser.

Accordingly, the invention relates to a method of protecting wood surfaces against light-induced degradation by treatment with a) an undercoat which penetrates the surface of the wood and which does not contain a light stabiliser, and b) one or more top coats, said undercoat containing at least one antioxidant of the type of the sterically hindered phenols.

The antioxidant is preferably a compound which contains at least one group of formula I

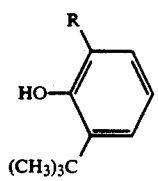

wherein R is hydrogen, methyl or tert-butyl, preferably wherein R is tert-butyl.

The antioxidant is preferably an ester of β-(3,5-di-tert-butyl-4-hydroxyphenyl)propionic acid, more particularly a compound of formula II

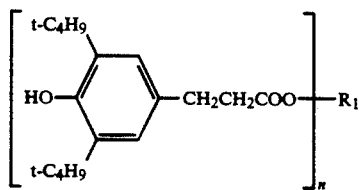

wherein n is 1, 2 or 4 and, when n=1, $R_1$ is $C_8H_{17}$, and when n=2, $R_1$ is —$(CH_2)_6$— or —$CH_2CH_2OCH_2CH_2OCH_2CH_2$—, and, when n=4, $R_1$ is —$(CH_2)_4C$.

The antioxidant is also preferably a compound of formula III

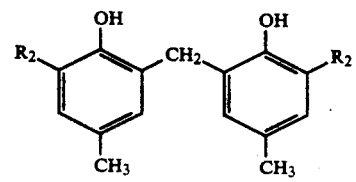

wherein $R_2$ is hydrogen, methyl or tert-butyl, preferably wherein $R_2$ is tert-butyl.

The antioxidant is also preferably a compound of formula IV

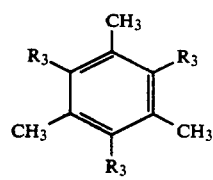

wherein $R_3$ is a group

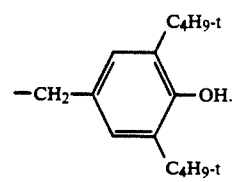

The antioxidant is also preferably a compound of formula V

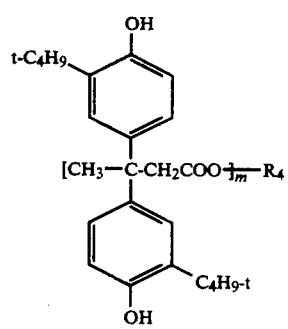

wherein either m is 1 and $R_4$ is methyl, or m is 2 and $R_4$ is —$CH_2CH_2$—.

The antioxidant is also preferably a compound of formula VI

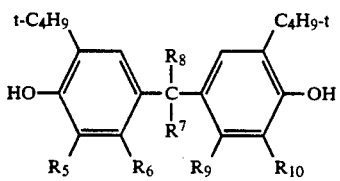

wherein R₅ and R₁₀ are hydrogen or tert-butyl, R₆ and R₉ are hydrogen or methyl, R₇ is hydrogen or methyl and R₈ is hydrogen or $C_1$–$C_4$alkyl.

The antioxidant is also preferably 3,5-di-tert-butyl-4-hydroxytoluene.

The following compounds are illustrative of antioxidants which are suitable for use in the method of this invention:

1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-di-nonyl-4-methylphenol.

2. Alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol.

3. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol).

4. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4methylphenyl] terephthalate.

5. Benzyl compounds, for example 1,3,5-tris(3,5-di-tert-butyl-4-hydroxybenzyl)-2,4,6-trimethylbenzene, bis(3,5-di-tert-butyl-4-hydroxybenzyl) sulfide, isooctyl 3,5-di-tert-butyl-4-hydroxybenzylmercaptoacetate, bis(4-tert-butyl-3-hydroxy-2,6-dimethylbenzyl) dithiolterephthalate, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, dioctadecyl 3,5-di-tert-butyl-4-hydroxybenzylphosphonate, calcium salt of monoethyl 3,5-di-tert-butyl-4-hydroxybenzylphosphonate, 1,3,5-tris(3,5-dicyclohexyl-4-hydroxybenzyl)isocyanurate.

6. Acylaminophenols, for example 4-hydroxylauranilide, 4-hydroxystearanilide, 2,4-bis(octylmercapto)-6-(3,5-di-tert-butyl-4-hydroxyanilino)-s-triazine, octyl N-(3,5-di-tert-butyl-4-hydroxyphenyl)carbamate.

7. Esters of β-(3,5-di-tert-butyl-4-hydroxyphenyl)-propionic acid with mono- or polyhydric alcohols, e.g. with methanol, octadecanol, 1,6-hexanediol, neopentyl glycol, triethylene glycol, pentaerythritol, tris(hydroxyethyl) isocyanurate, thiodiethylene glycol, N,N'-bis(-hydroxyethyl)oxalodiamide.

8. Esters of β-(5-tert-butyl-4-hydroxy-3-methylphenyl)propionic acid with mono- or polyhydric alcohols, e.g. with methanol, diethylene glycol, octadecanol, triethylene glycol, 1,6-hexanediol, pentaerythritol, neopentyl glycol, tris(hydroxyethyl) isocyanurate, thiodiethylene glycol, N,N'-bis(hydroxyethyl)oxalodiamide.

9. Esters of β-(3,5-dicyclohexyl-4hydroxyphenyl)-propionic acid with mono- or polyhydric alcohols, e.g. with methanol, diethylene glycol, octadecanol, triethylene glycol, 1,6-hexanediol, pentaerythritol, neopentyl glycol, tris(hydroxyethyl) isocyanurate, thiodiethylene glycol, N,N'-bis(hydroxyethyl)oxalodiamide.

10. Amides of β-(3,5-di-tert-butyl-4-hydroxyphenyl)-propionic acid e.g. N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)hydrazine.

In specific cases it may be useful to use two or more antioxidants.

The undercoat shall penetrate the surface of the wood, and should therefore be of relatively low viscosity. In the simplest case, the undercoat is a solution of the antioxidant in an organic solvent. Exemplary of useful solvents for the purpose are aliphatic hydrocarbons such as specific petroleum fractions. Further suitable solvents are aromatic hydrocarbons such as toluene or xylene; alcohols such as methanol, ethanol, isopropanol or butanol; esters such as ethyl acetate or butyl acetate; or ketones such as acetone, methyl ethyl ketone or methyl isobutyl ketone. These solvents evaporate at room temperature and therefore do not remain in the wood. It is, however, also possible to add high boiling liquids which remain in the wood, for example higher alkanols, glycols, glycol ethers, glycol esters or polyglycols. The undercoat may also contain a binder conventionally used for protective wood coatings. Exemplary of suitable binders are alkyd resins and modified alkyd resins, autocrosslinking or non-autocrosslinking acrylic resins, polyester resins, drying oils, phenolic resins, nitrocellulose or mixtures thereof.

The undercoat may also contain one or more phosphites which synergise the action of the antioxidants. Illustrative examples of such phosphites are: triphenyl phosphite, diphenylalkyl phosphite, phenyldialkyl phosphite, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, tristearyl sorbitol triphosphite. Tris-(2,4-di-tert-butylphenyl) phosphite is particularly preferred.

The undercoat may also contain preservatives such as fungicides or insecticides. Exemplary of useful fungicides are tributyltin oxide, phenylmercury salts, copper naphthenate, 1-chloronaphthalene or pentachlorophenol. Exemplary of useful insecticides are DDT, dieldrin, lindane, parathion or phoxime.

Further ingredients which may be present in the undercoat are minor amounts of accelerators (hardeners) for the binders, dyes or pigments.

The undercoat consists mainly of the solvent and contains typically 0.05 to 10%, preferably 0.1 to 5%, of the antioxidant. It can further contain 0.1 to 5% by weight of a phosphite.

The undercoat can be applied to the wood by conventional techniques, for example by impregnating, spreading or spraying.

The undercoat may also be an aqueous coating. Instead of the organic solvent, the vehicle may then consist of water or a mixture of water and a water-soluble organic solvent. The antioxidant and the other components may be dissolved or dispersed in this vehicle.

Any coating composition suitable for coating wood may be used as top coat. It will normally contain a binder, dissolved or dispersed in an organic solvent or in water or a mixture of water and solvent. The binder may typically be a surface coating resin which dries in the air or hardens at room temperature. Exemplary of such binders are nitrocellulose, polyvinyl acetate, polyvinyl chloride, unsaturated polyester resins, polyacrylates, polyurethanes, epoxy resins, phenolic resins, and especially alkyd resins. The binder may also be a mixture of different surface coating resins. Provided the binders are curable binders, they are normally used together with the hardener and/or accelerator.

Typical examples of organic solvents which may suitably be used for the coating compositions are aliphatic, aromatic or cycloaliphatic hydrocarbons, alcohols, esters, ketones or chlorinated hydrocarbons.

Water/solvent mixtures are typically mixtures of water and lower alcohols, glycols or glycol ethers.

The top coat may also be a radiation-curable, solvent-free formulation of photopolymerisable compounds. Illustrative examples are mixtures of acrylates or methacrylates, unsaturated polyester/styrene mixtures or mixtures of other ethylenically unsaturated monomers or oligomers.

The top coat may contain a soluble dye and/or a pigment and/or a filler. The pigment may be an organic, inorganic or metallic pigment. The filler may be typically kaolin, calcium carbonate or aluminium silicate. Preferably the top coat is a clear varnish, i.e. it contains no undissolved components.

Although the top coat which contains the antioxidant affords good protection against light, it is advantageous to add a light stabiliser to the top coat. Illustrative examples of suitable light stabilisers are the following compounds:

1. 2-(2'-Hydroxyphenyl)benzotriazoles, for example the 5'-methyl, 3',5'-di-tert-butyl, 5'-tert-butyl, 5'-(1,1,3,3-tetramethylbutyl), 5-chloro-3',5'-di-tert-butyl, 5-chloro-3'-tert-butyl-5'-methyl, 3'-sec-butyl-5'-tert-butyl, 4'-octoxy, 3',5'-di-tert-amyl and 3',5'-bis($\alpha,\alpha$-dimethylbenzyl) derivative, the octyl ester of 3-(5-chlorobenzotriazol-2-yl)-4-hydroxy-5-tert-butylphenylpropionic acid or the polyglycol 300 ester of 3-(benzotriazol-2-yl)-4-hydroxy-5-tert-butylphenylpropionic acid.

2. 2-Hydroxybenzophenones, for example the 4-hydroxy, 4-methoxy, 4-octoxy, 4-decyloxy, 4-dopdecyloxy, 4-benzyloxy, 4,2',4'-trihydroxy and 2'-hydroxy-4,4'-dimethoxy derivative.

3. Esters of substituted and unsubstituted benzoic acids, for example, 4-tert-butylphenyl salicylate, phenyl salicylate, octylphenyl salicylate, dibenzoylresorcinol, bis(4-tert-butylbenzoyl)-resorcinol, benzoylresorcinol, 2,4-di-tert-butylphenyl 3,5-di-tert-butyl-4-hydroxy-benzoate and hexadecyl 3,5-di-tert-butyl-4-hydroxybenzoate.

4. Acrylates, for example ethyl $\alpha$-cyano-$\beta,\beta$-diphenylacrylate, isooctyl $\alpha$-cyano-$\beta,\beta$-diphenylacryalte, methyl $\alpha$-carbomethoxycinnamate, methyl $\alpha$-cyano-$\beta$-methyl-p-methoxy-cinnamate, butyl $\alpha$-cyano-$\beta$-methyl-p-methoxy-cinnamate, methyl $\alpha$-carbomethoxy-p-methoxycinnamate and N-($\beta$-carbomethoxy-$\beta$-cyanovinyl)-2-methylindoline.

5. Nickel compounds, for example nickel complexes of 2,2'-thio-bis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of 4-hydroxy-3,5-di-tert-butylbenzyl-phosphonic acid monoalkyl esters, e.g. of the methyl or ethyl ester, nickel complexes of ketoximes, e.g. of 2-hydroxy-4-methyl-phenyl undecyl ketoneoxime, nickel complexes of 1-phenyl-4-lauroyl-5-hydroxypyrazole, with or without additional ligands.

6. Sterically hindered amines, for example bis(2,2,6,6-tetramethylpiperidyl) sebacate, bis(1,2,2,6,6-pentamethylpiperidyl) sebacate, bis(1,2,2,6,6-pentamethylpiperidyl) n-butyl-3,5-di-tert-butyl-4-hydroxy-benzylmalonate, the condensation product of 1-(2-hydroxyethyl)-2,2,6,6-tetramethyl-4-hydroxypiperidine and succinic acid, the condensation product of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetraoate, 1,1'-(1,2-ethanediyl)bis-(3,3,5,5-tetramethylpiperazinone).

7. Oxalyl diamides, for example 4,4'-dioctyloxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxalamide, 2-ethoxy-5-tert-butyl-2'-ethyloxanilide and its mixture with 2-ethoxy-2'-ethyl-5,4'-di-tert-butoxanilide and mixtures of ortho- and para-methoxy-disubstituted oxanilides and mixtures of o- and p-ethoxydisubstituted oxanilides.

8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxy-phenyl)-4,6-bis(2,4-dimethylphenyl)-1,3,5-triazine, 2-(2,4-dihydroxy-phenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine.

Light stabilisers of classes 1, 6 and 8 are preferred.

The addition of a mixture of a UV absorber of classes 1, 2, 3, 4, 7 and 8, preferably 1 and 8, together with a sterically hindered amine, for example of class 6 above, is particularly effective.

The amount of light stabiliser, or the sum of the light stabilisers, used is preferably 0.1 to 5% by weight, based on the solids content.

The top coat may further contain conventional additives of coating technology, for example levelling agents, thixotropic agents, flame retardants, antioxidants or soluble dyes.

The application of the top coat is made by conventional techniques of wood coating, for example by spreading, spraying or impregnating.

The top coat can be applied in several coats so that it has a sufficient layer thickness. How thick the top coat shall be will depend on the intended end use.

The following Examples illustrate the invention in detail. Parts and percentages are by weight.

The following stabilisers are used in the Examples:

AO-1: octadecyl-β-(3,5-di-tert-butyl-4-hydroxyphenyl)propionate

AO-2: β-(3,5-di-tert-butyl-4-hydroxyphenyl)propionate of pentaerythritol

AO-3: bis[β-(3,5-di-tert-butyl-4-hydroxyphenyl)propionate] of triethylene glycol AO-4: 2,4,6-tris(3,5-di-tert-butyl-4-hydroxybenzyl)1,3,5-trimethylbenzene AO-5: bis[β-bis(3-tert-butyl-4-hydroxyphenyl)butyrate] of ethylene glycol AO-6: bis(2-hydroxy-3-tert-butyl-5-methylphenyl)methane LS-1: β-[3-(benzotriazol-2-yl)-4-hydroxy-5-tert-butylphenyl]propionate of polyethylene glycol 300

LS-2: bis(1,2,2,6,6-pentamethylpiperid-4-yl)sebacate

P-1: tris(2,4-di-tert-butylphenyl)phosphite

EXAMPLE 1

An undercoat is prepared from 27 parts of an alkyd resin (Jägalyd Antihydro ®, E. Jäger KG, 60% solution in white spirit)

1 part of an accelerator (Antihydro Trockner ®, E. Jäger KG)

3 parts of 2-ethoxyethanol 0.5 part of an anti-skinning agent (Ascinin ® P, Bayer AG)

1.3 parts of a preservative (Traetex ® 293, Acima AG)

67.2 parts of white spirit.

This undercoat has a solids content of ca. 17%. To this undercoat is added a solution of each of the antioxidants listed in Table 1 in 10 parts of xylene. The undercoat is applied with a brush to pinewood boards (30×10×1.5 cm) and dried for 24 hours at room temperature.

The top coat is an alkyd resin based glaze of the following composition:

53 parts of an alkyd resin as 60% solution in white spirit (Jägalyd ® Antihydro)

11 parts of a thixotropic agent as 50% solution in white spirit (Jägalyd ® Antihydro Thix N)

1.9 parts of an accelerator (Antihydro Trockner ®, Jäger)

33.4 parts of white spirit K 60

0.3 part of an anti-skinning agent (Ascinin ® P, Bayer AG)

0.4 part of a preservative (Exkin ® II, Servo BV)

This glaze contains no pigment and has a solids content (binder) of ca. 38%. If the top coat contains light stabilisers, these are predissolved in a small amount of xylene.

The top coat is applied with a brush in three layers to the boards treated with the undercoat. Between the application of each layer, the specimen is allowed to dry for 24 hours at room temperature.

The specimens are exposed to weathering near Zürich in the open at 45° south. The surface gloss and fungus infestation of the surface are assessed after 11 months.

TABLE 1

| Antioxidant in the undercoat[1] | Light stabiliser in the top coat[1] | 60° gloss | fungus infestation on the surface |
|---|---|---|---|
| none | none | no longer measurable | 100% |
| none | 1% LS-1 1% LS-2 | 40% | 70% |
| 1% AO-1 | none | 73% | 20% |
| 1% AO-1 | 1% LS-1 1% LS-2 | 73% | 5% |

[1]Amount based on solids content of the coat

EXAMPLE 2

An undercoat (impregnation) is prepared from 2 parts of an alkyd resin (Jägalyd ® Antihydro, 60% solution in white spirit)

1 part of accelerator (Jägalyd ® Antihydro Trockner)

3 parts of 2-ethoxyethanol 0.2 part of an anti-skinning agent (Luactim ® M, BASF AG)

1.3 parts of a preservative (Traetex ® 293, Acima AG)

52.5 parts of white spirit 15 parts of xylene.

This undercoat has a solids content of ca. 17%. To the undercoat is added a solution of each of the antioxidants listed in Table 2 in an amount of 1%, based on solids (=0.17 part, based on the undercoat).

The undercoat is applied with a brush to pinewood boards and dried for 24 hours at room temperature. The glaze described in Example 1 is used as top coat and is applied in 3 layers with a brush as described in Example 1.

The specimens are exposed to weathering in the open for 4.5 months in Basel at 45° south. Before and after weathering, the Yellowness Index (YI) of the surface of the specimens is measured in accordance with ASTM D 1 925. The increase in the YI after weathering is indicated in Table 2.

TABLE 2

| Antioxidant in the undercoat[*] | Increase in the YI after 4.5 months weathering |
|---|---|
| none | 38.5 |
| 1% AO-2 | 32.5 |
| 1% AO-3 | 33.2 |
| 0.5% AO-2 + 0.5% P-1 | 34.2 |
| 0.5% AO-4 + 0.5% P-1 | 35.2 |

[*]Amount based on the solids content of the undercoat

EXAMPLE 3

A 0.5% solution of the antioxidant in xylene is used as undercoat (impregnation). This undercoat is applied with a brush to the wood and then the specimens are dried for 24 hours at room temperature.

The glaze described in Example 1 is used as top coat and applied as in Example 1.

The specimens are exposed to weathering in the open for 4.5 months in Basel at 45° south. The Yellowness Index (YI) is measured before and after weathering.

TABLE 3

| Antioxidant in the undercoat | Increase in YI after 4.5 months |
|---|---|
| none | 37.1 |
| AO-2 | 32.8 |
| AO-5 | 34.8 |
| AO-6 | 33.4 |

TABLE 3-continued

| Antioxidant in the undercoat | Increase in YI after 4.5 months |
|---|---|
| AO-4 + 0.5% P-1 | 32.1 |

EXAMPLE 4

The undercoats and top coats described in Example 1 are used and applied to pinewood boards as described therein.

The specimens are exposed to weathering in a xenon light accelerated weathering test (cycle: 102 min. dry exposure, 18 min. sprinkling). The 60° gloss of the surface of the specimens is measured according to DIN 67 530 at specific intervals. The results are reported in Table 4.

| Antioxidant in the undercoat[a] | % gloss after exposure time of | | | |
|---|---|---|---|---|
| | 262 h | 533 h | 1039 h | 1302 h |
| none | 43 | 51 | 22 | 10 |
| 1% AO-1 | 53 | 64 | 59 | 30 |
| 1% AO-3 | 62 | 68 | 70 | 51 |

[a] Amount based on the solids content of the undercoat

What is claimed is:

1. A method of protecting wood surfaces against light-induced degradation by treatment with
   a) an undercoat which penetrates the surface of the wood and which does not contain a light stabiliser, said undercoat comprising an aqueous or organic solvent, or said solvent containing a binder selected from the group consisting of alkyd resins, modified alkyd resins, acrylic resins, polyester resins, drying oils, phenolic resins, nitrocellulose and mixtures thereof, and
   b) at least one top coat comprising a resin selected from the group consisting of nitrocellulose, polyvinyl acetate, polyvinyl chloride, unsaturated polyester resins, polyacrylates, polyurethanes, epoxy resins, phenolic resins, alkyd resins and mixtures thereof,
   said undercoat containing at least one antioxidant of the sterically hindered phenols.

2. A method according to claim 1, wherein the antioxidant is a compound which contains at least one 3-tert-butyl-4-hydroxy-5-R-phenyl moiety wherein R is hydrogen, methyl or tert-butyl.

3. A process according to claim 2, wherein R is tert-butyl.

4. A process according to claim 1, wherein the antioxidant is an ester of β-(3,5-di-tert-butyl-4-hydroxyphenyl)propionic acid.

5. A process according to claim 4, wherein the antioxidant is a compound of formula II

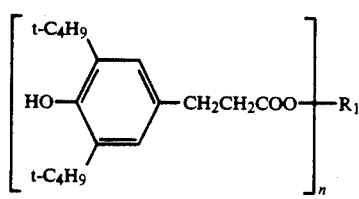

II wherein n is 1,2 or 4 and, when n=1, $R_1$ is $C_8H_{17}$, and when n=2, $R_1$ is —$(CH_2)_6$— or —$CH_2CH_2OCH_2CH_2OCH_2CH_2$—, and, when n=4, $R_1$ is —$(CH_2)_4C$.

6. A process according to claim 1, wherein the antioxidant is a compound of formula III

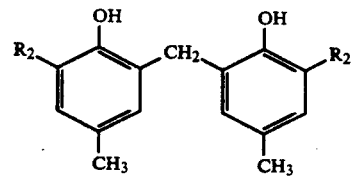

III wherein $R_2$ is hydrogen, methyl or tert-butyl.

7. A process according to claim 6, wherein $R_2$ is tert-butyl.

8. A process according to claim 1, wherein the antioxidant is a compound of formula IV

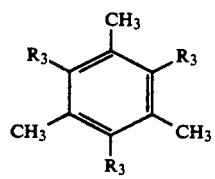

IV wherein $R_3$ is a group

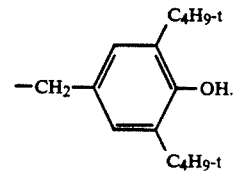

9. A process according to claim 1, wherein the antioxidant is a compound of formula V

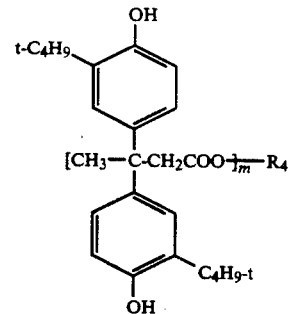

V wherein either m is 1 and $R_4$ is methyl, or m is 2 and $R_4$ is —$CH_2CH_2$—.

10. A process according to claim 1, wherein the antioxidant is a compound of formula VI

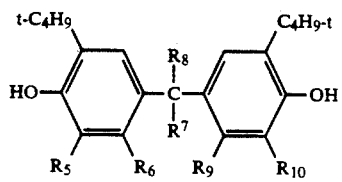

VI wherein $R_5$ and $R_{10}$ are hydrogen or tert-butyl, $R_6$ and $R_9$ are hydrogen or methyl, $R_7$ is hydrogen or methyl and $R_8$ is hydrogen or $C_1$–$C_4$alkyl.

11. A process according to claim 1, wherein the antioxidant is 3,5-di-tert-butyl-4-hydroxy-toluene.

12. A process according to claim 1, wherein the undercoat contains a binder or a high boiling liquid selected from the group consisting of the higher alkanols, glycols, glycol ethers, glycol esters and polyglycols; or a mixture thereof.

13. A process according to claim 1, wherein the undercoat contains a phosphite.

14. A process according to claim 1, wherein the undercoat contains tris(2,4-di-tert-butylphenyl)phosphite.

15. A process according to claim 1, wherein the undercoat contains a preservative.

16. A process according to claim 1, wherein the top coat is a clear varnish.

17. A process according to claim 1, wherein the top coat contains an alkyd resin based binder.

18. A process according to claim 1, wherein the top coat contains one or more light stabilisers.

19. A process according to claim 1, wherein the top coat contains a UV absorber and a sterically hindered amine as light stabilisers.

* * * * *